United States Patent
Gieras et al.

(10) Patent No.: US 7,859,231 B2
(45) Date of Patent: *Dec. 28, 2010

(54) PERMANENT MAGNET ELECTRIC GENERATOR WITH VARIABLE MAGNET FLUX EXCITATION

(75) Inventors: Jacek F. Gieras, Glastonbury, CT (US); Gregory I. Rozman, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 500 days.

This patent is subject to a terminal disclaimer.

(21) Appl. No.: 12/061,309

(22) Filed: Apr. 2, 2008

(65) Prior Publication Data

US 2009/0251112 A1 Oct. 8, 2009

(51) Int. Cl.
*H02K 3/493* (2006.01)
(52) U.S. Cl. ......................................... 322/46; 310/180
(58) Field of Classification Search .................. 322/46, 322/37, 59; 310/180, 190
See application file for complete search history.

(56) References Cited

U.S. PATENT DOCUMENTS 5,281,905 A * 1/1994 Dhyanchand et al. ......... 322/32
7,439,713 B2 * 10/2008 Dooley ......................... 322/22
7,579,812 B2 * 8/2009 Dooley ......................... 322/46
7,683,587 B2 * 3/2010 Inaba et al. .................... 322/20
7,777,384 B2 * 8/2010 Gieras et al. ................. 310/180
2007/0247120 A1 * 10/2007 Dooley et al. ................. 322/89
2008/0079417 A1 * 4/2008 Viitanen .................... 324/76.53

* cited by examiner

Primary Examiner—Nicholas Ponomarenko
(74) Attorney, Agent, or Firm—Stephen G. Mican

(57) ABSTRACT

A permanent magnet (PM) electric generator with directly controllable field excitation control comprises: a drive shaft; a PM rotor assembly with multiple PMs arranged around an outer axial periphery of the rotor assembly; a stator assembly comprising a ferromagnetic stator yoke, multiple ferromagnetic stator teeth mounted to the stator yoke with distal ends proximate the outer axial periphery of the rotor assembly separated by an air gap and multiple stator coils mounted between the stator teeth; multiple saturable ferromagnetic shunts, each shunt coupling adjacent distal ends of the stator teeth to shunt air gap magnetic flux $\Phi_g$ generated by the PMs across the air gap through the distal ends of the stator teeth; and multiple saturation control coils, each saturation control coil wrapped about a saturable region of an associated one of the shunts; wherein application of a control current $I_c$ to the control coils at least partially magnetically saturates the shunts to reduce shunting of air gap magnetic flux $\Phi_g$, thereby increasing magnetic flux linkage $\Psi_M$ between the PMs and the stator coils and increasing generated electromagnetic force (EMF) at lower levels of rotor assembly angular velocity.

20 Claims, 5 Drawing Sheets

PERMANENT MAGNET ELECTRIC GENERATOR WITH VARIABLE MAGNET FLUX EXCITATION

FIELD OF THE INVENTION

The invention relates to permanent magnet (PM) electric generators, and more particularly to PM electric generators with variable magnetic flux excitation.

BACKGROUND OF THE INVENTION

Electrical power generation systems powered by variable speed prime movers that require highly regulated electrical output, such as electrical power generation systems used for aeronautical applications, generally use a wound field synchronous machine (WFSM) that serves as an electrical generator. This is because it is easy to adjust rotor current to regulate electrical output of a WFSM. In aeronautical applications, the prime mover is often a gas turbine engine that has a normal angular velocity that exceeds 20,000 revolutions per minute. Due to the angular velocity limitations of the WFSM, such electrical power generation systems generally require a reduction gearbox between the prime mover and the WFSM. This increases weight, cost and complexity of the electrical power generation systems.

Electrical power generation systems may alternatively employ an electrical machine of the permanent magnet (PM) type as an electrical generator. Such a PM machine is capable of much higher angular velocity than a WFSM of similar output and therefore it is capable of direct coupling to the prime mover, thereby eliminating the reduction gearbox. This results in reduced weight, cost and complexity of an electrical power generation system. However, traditional PM machines have no convenient means to alter magnetic flux for regulating their output.

An electrical power generation system may alternatively use a regulated PM machine that has a field excitation control winding. These so-called hybrid electric machines with PMs and an additional field excitation winding for direct flux control may be a better choice for industrial motor drives and generators. However, most such hybrid electric machines have relatively complex designs with resulting increases in size, weight and expense.

SUMMARY OF THE INVENTION

The invention generally comprises a permanent magnet (PM) electric generator with directly controllable field excitation control comprising: a drive shaft; a PM rotor assembly with multiple PMs arranged around an outer axial periphery of the rotor assembly; a stator assembly comprising a ferromagnetic stator yoke, multiple ferromagnetic stator teeth mounted to the stator yoke with distal ends proximate the outer axial periphery of the rotor assembly separated by an air gap and multiple stator coils mounted between the stator teeth; multiple saturable ferromagnetic shunts, each shunt coupling adjacent distal ends of the stator teeth to shunt air gap magnetic flux $\Phi_g$ generated by the PMs across the air gap through the distal ends of the stator teeth; and multiple saturation control coils, each saturation control coil wrapped about a saturable region of an associated one of the shunts; wherein application of a control current $I_c$ to the control coils at least partially magnetically saturates the shunts to reduce shunting of air gap magnetic flux $\Phi_g$, thereby increasing magnetic flux linkage $\Psi_M$ between the PMs and the stator coils and increasing generated electromagnetic force (EMF) at lower levels of rotor assembly angular velocity.

DETAILED DESCRIPTION OF THE INVENTION

Figure 1:
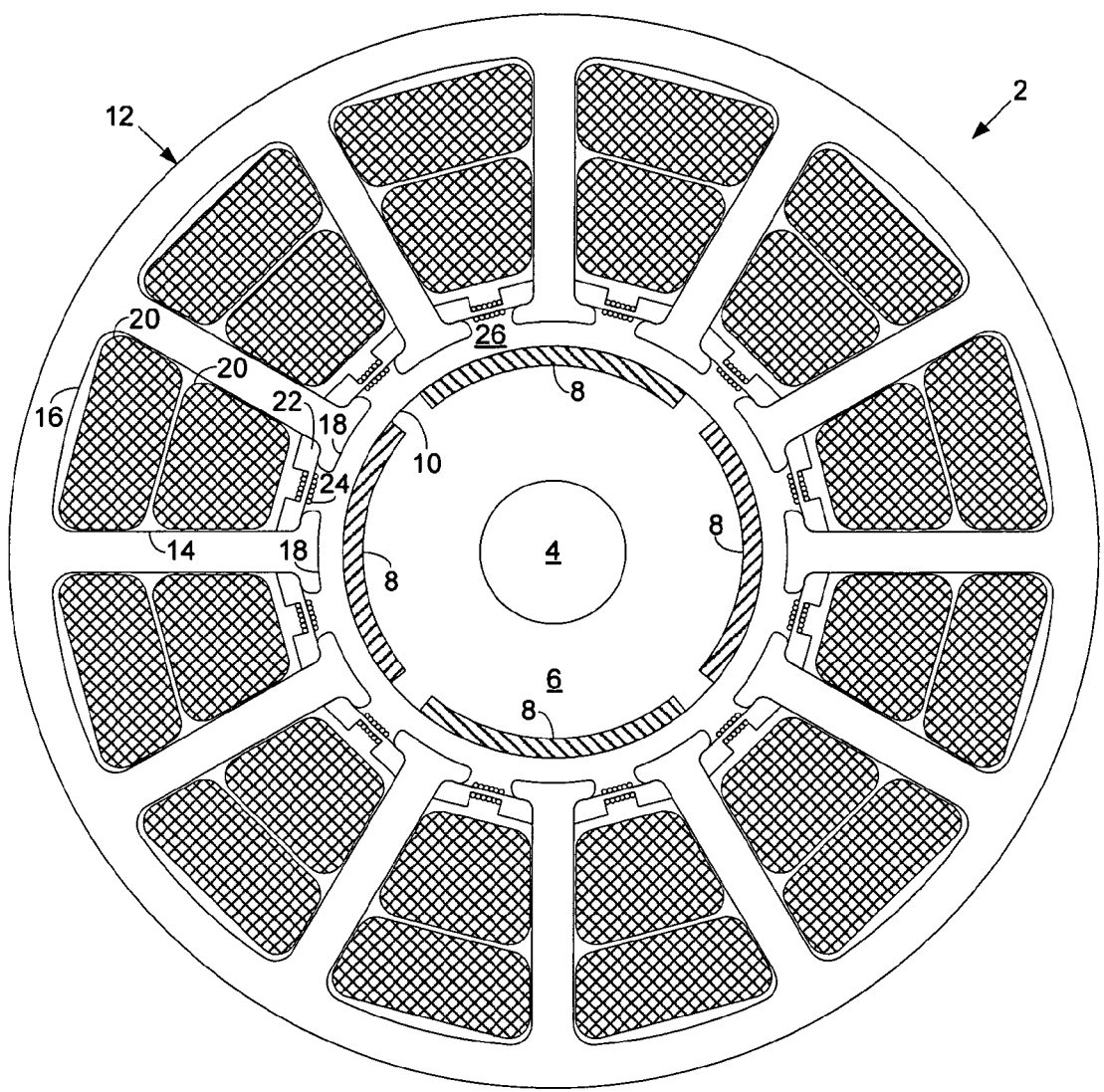
FIG. 1 is a cut-away end view of a permanent magnet (PM) dynamoelectric machine according to one possible embodiment of the invention.

FIG. 1 is a cut-away end view of a permanent magnet (PM) dynamoelectric machine 2 according to one possible embodiment of the invention. The machine 2 has a drive shaft 4 that couples to a PM rotor assembly 6. The PM rotor assembly 6 comprises multiple PMs 8 mounted about its outer annular periphery 10. By way of example only, FIG. 1 shows the PM rotor assembly 6 with four PMs 8.

A multiple pole stator assembly 12, typically of the multiphase alternating current (AC) type, circumscribes the rotor assembly 6. The stator assembly 12 has multiple ferromagnetic stator teeth 14 coupled to a ferromagnetic stator yoke 16, one stator tooth 14 for each of the poles of the stator assembly 12. A distal end 18 of each stator tooth 14 is proximate the outer annular periphery 10 of the rotor assembly 6. The stator assembly 12 also has multiple stator coils 20 mounted between the stator teeth 14. By way of example only, FIG. 1 shows the stator coils 20 arranged in a multiphase AC two-layer wrap.

The hereinbefore-identified components of the machine 2 describe a typical PM dynamoelectric machine. In operation as an electric generator, a prime mover (not shown) coupled to the drive shaft 4 rotates the rotor assembly 6. With a magnetic flux linkage $\Psi_M$ between the PMs 8 and the stator coils 20, the rotating magnetic field that the PMs 8 generate causes magnetic excitation flux to flow through the stator coils 20, thereby generating multiphase electrical power in the stator coils 20. Fixed excitation flux provided by the PMs 8 in the rotor assembly 6 limits the use of the machine 2, since electromotive force (EMF) that the machine 2 generates is proportional to the rate of change of magnetic flux passing through the stator coils 20 and this rate of change is proportional to the angular velocity of the rotor assembly 6. Thus, for any variation in angular velocity of the prime mover, the EMF of the machine 2 will vary as well.

It is possible to regulate the EMF of the machine 2 over a range of angular velocities of the rotor assembly 6 by means of proportionally changing the magnetic flux linkage $\Psi_M$. The machine 2 is able to regulate the magnetic flux linkage $\Psi_M$ directly by means of multiple magnetically saturable ferromagnetic shunts 22, each generally wedge-shaped shunt 22 inserted and mounted between the corresponding distal ends 18 of adjacent stator teeth 14. Each shunt 22 has an associated saturation control coil 24. The control coils 24 may connect to each other in a series or parallel configuration, although series is preferred, and may receive DC or AC control current for $I_c$ saturation control.

The shunts 22 preferably comprise a laminated ferromagnetic alloy or sintered magnetic powder construction. The shunts 22 with their associated control coils 24 preferably are insertable between the stator teeth 14 of the stator assembly 12 proximate their distal ends 18. The control coils 24 may comprise coils of round, rectangular or foil conductors.

The shunts 22 behave as magnetic flux shunts or diverters for magnetic flux that the rotor assembly 6 generates. When the magnetic reluctance of the shunts 22 is low, such as with no control current passing through their associated control coils 24, the shunts 22 shunt most of an air gap magnetic flux $\Phi_g$ generated by the PMs 8 that passes across an air gap 26 between the outer axial periphery 10 of the rotor assembly 6 and the distal ends 18 of the stator teeth 14. That is, a shunting magnetic flux closely approximates air gap magnetic flux [$\Phi_{sh} \approx \Phi_g$] with no control current passing through the control coils 24. As a result, the magnetic flux linkage $\Psi_M$ between the PMs 8 and the stator coils 20 is low and the corresponding EMF generated by the machine 2 is low for a given angular velocity of the rotor assembly 6, since it is proportional to the magnetic flux linkage $\Psi_M$.

When the control current $I_c$ is greater than zero, the shunts 22 partially saturate, their magnetic permeability decreases, their reluctance increases and therefore they only shunt a portion of the air gap flux $\Psi_g$ so that $\Phi_{sh} < \Phi_g$. The magnetic flux linkage $\Psi_M$ between the PMs 8 and the stator coils 20 increases. Likewise, for a given angular velocity of the rotor assembly 6, the EMF induced in the stator coils 20 increases as well. Further increase in the control current $I_c$ reduces the reluctance of the shunts 22 still further and their relative magnetic permeability approaches unity. Fully saturated shunts 22 behave as free space so that almost the entire air gap magnetic flux $\Phi_g$ generated by the PMs 8 penetrates through the stator teeth 14 and stator yoke 16 so that the magnetic flux linkage $\Psi_M$ approximates the air gap flux $\Phi_g$. This generates maximum EMF in the stator coils 20 for a given angular velocity of the rotor assembly 6. Thus, for any given angular velocity of the rotor assembly 6, there is a value of control current $I_c$ that will maintain a constant desired value of EMF from the machine 2.

Figure 2:
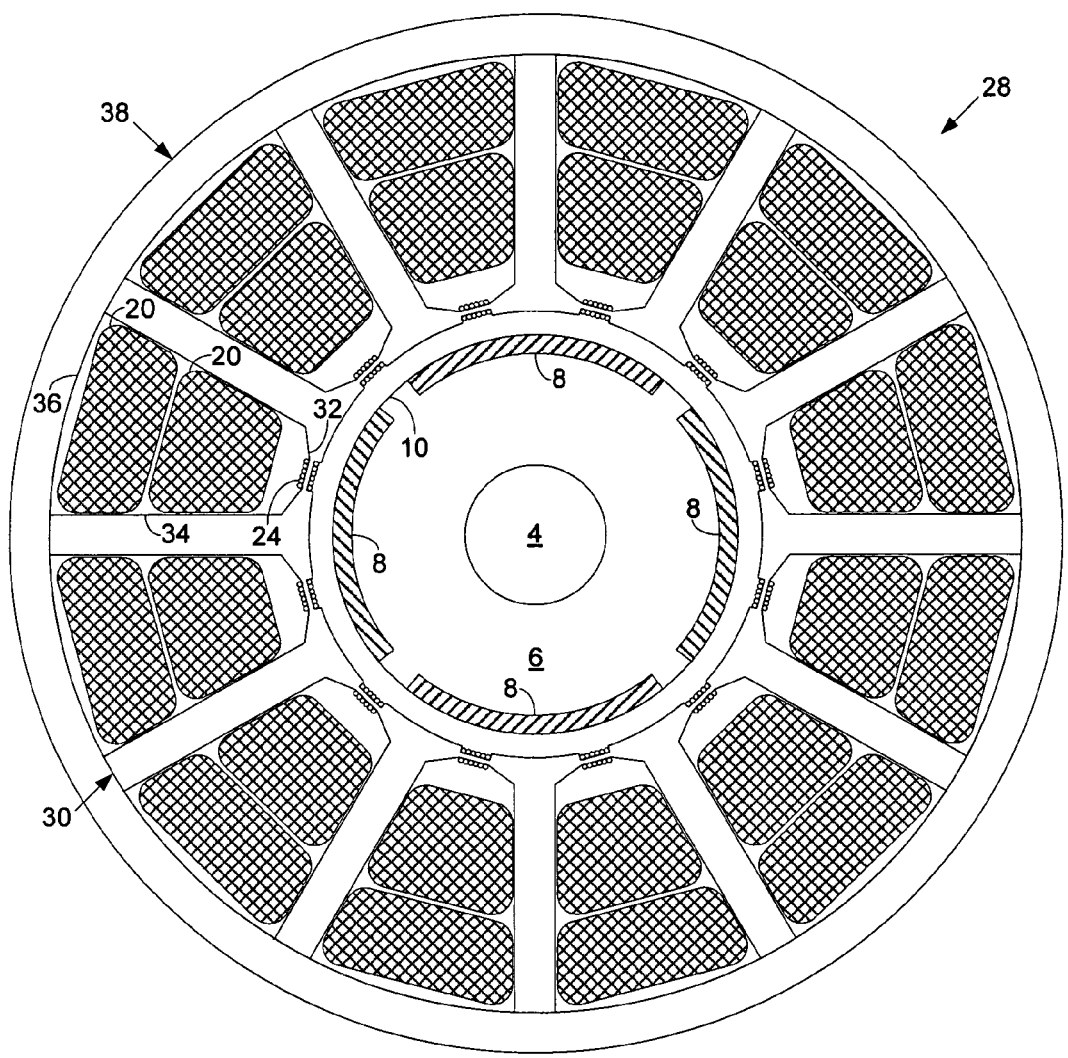
FIG. 2 is a cut-away end view of a PM dynamoelectric machine according to another possible embodiment of the invention.

FIG. 2 is a cut-away end view of a PM dynamoelectric machine 28 according to another possible embodiment of the invention. In this embodiment, a generally star-shaped stator shunt and tooth structure 30 comprises integral saturable ferromagnetic shunts 32 and stator teeth 34. Each shunt 32 is a saturable ferromagnetic region between adjacent stator teeth 34 of the stator shunt and tooth structure. Each shunt 32 has an associated saturation control coil 24. The star-shaped shunt and tooth structure 30 may conveniently comprise a ferromagnetic stamping. The shunt and tooth structure 30 mounts in a stator yoke 36 to form a complete stator assembly 38. It is identical in function and operation to the embodiment of the invention hereinbefore described in connection with FIG. 1.

Figure 3:
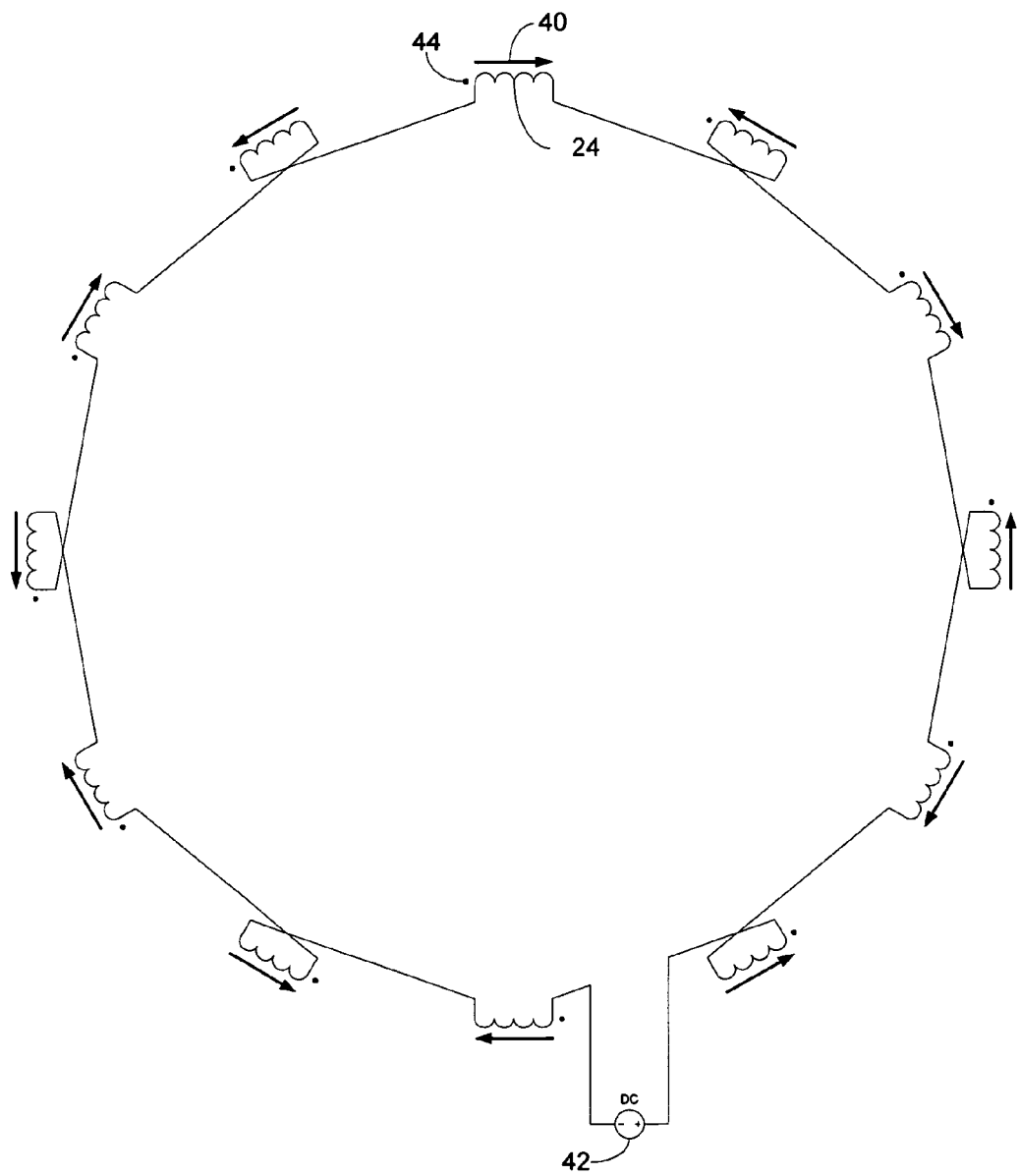
FIG. 3 is a schematic representation of control coils for the PM dynamoelectric machines of FIGS. 1 and 2 that shows their respective shunt magnetic fluxes $\Phi_{sh}$ and control current $I_c$ provided by a control current source.

The magnetic flux that the PMs 8 generate may induce some AC voltage in the control coils 24. If this is objectionable, a special connection of the control coils 24 will cancel this effect. Such a special connection means connecting adjacent control coils 24 to arrange their respective shunt magnetic fluxes $\Phi_{sh}$ in opposition. FIG. 3 is a schematic representation of the control coils 24 with their respective shunt magnetic fluxes $\Phi_{sh}$, represented by arrows 40, with control current $I_c$ provided by a control current source 42. Dots 44 represent the phasing of the control coils 24. This connection may comprise a serial connection of the control coils 24 with adjacent control coils 24 in phase opposition, such as a first side of each control coil 24, represented by its respective dot 44, connecting to a first side of a preceding adjacent control coil 24 in the series connection and a second side of each control coil 24 opposite the first side connecting to second side of the following adjacent control coil 24 in the series connection. This connection is only possible with the use of direct current DC for the source 42 of control current $I_c$.

Figure 4:
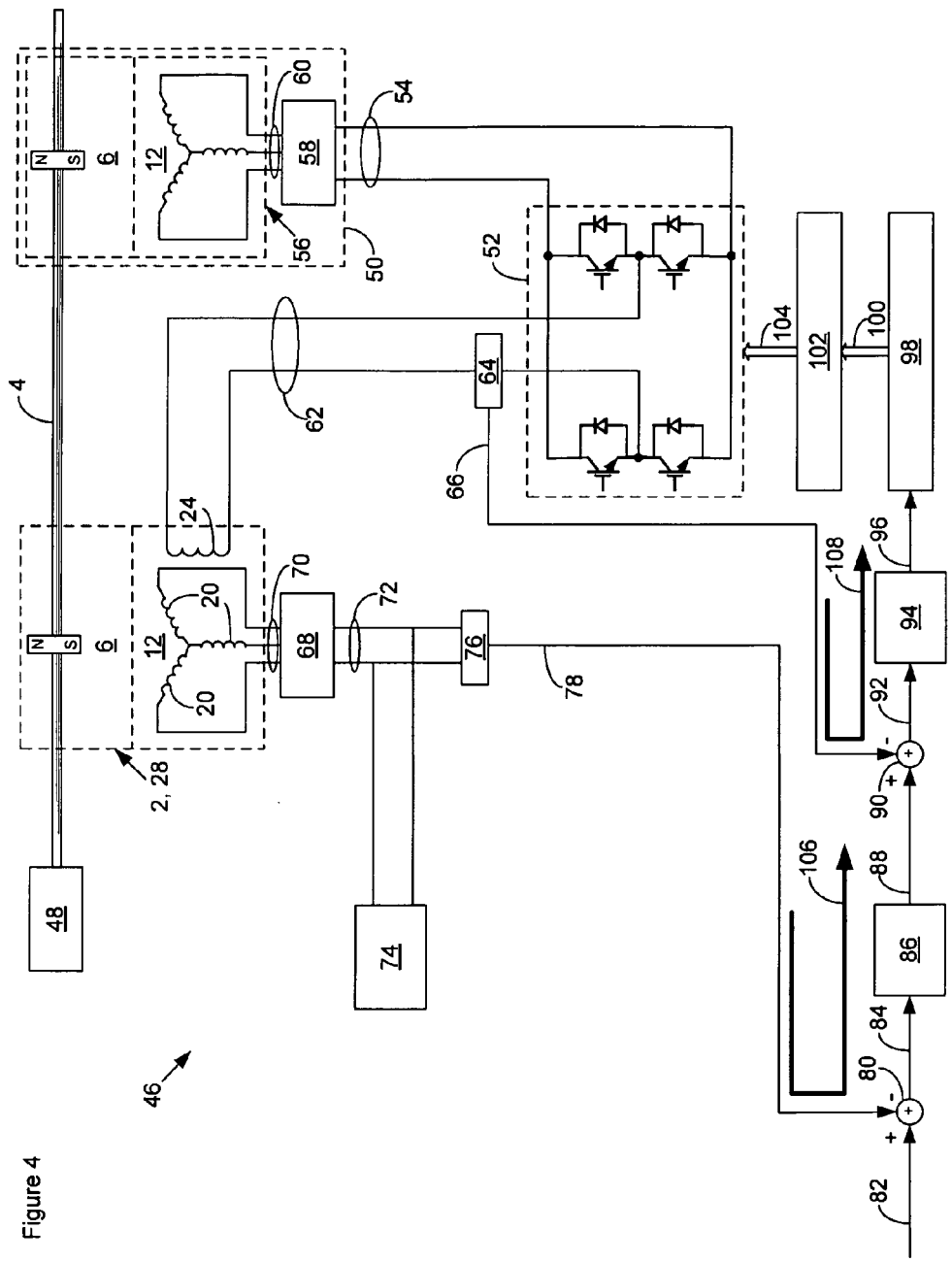
FIG. 4 is a high-level schematic representation of an electrical power generating system according to a possible embodiment of the invention.

FIG. 4 is a high-level schematic representation of an electrical power generating system 46 according to a possible embodiment of the invention comprising a prime mover 48, such as an aeronautical gas turbine engine, and the PM dynamoelectric machine with multiple magnetically saturable ferromagnetic shunts, such as the PM dynamoelectric machine 2 as shown in FIG. 1 or the PM dynamoelectric machine 28 as shown in FIG. 2. The prime mover 48 drives the machine 2, 28 by way of its drive shaft 4. An auxiliary power source 50 supplies power to a control current regulator 52 by way of an auxiliary power bus 54.

The auxiliary power source 50 may be AC or DC. It preferably comprises a multiphase AC auxiliary PM dynamoelectric machine 56 driven by the drive shaft 4 and a multiphase AC rectifier 58 that receives multiphase AC power from the auxiliary machine 56 on a multiphase AC auxiliary power bus 60 and converts it to DC power on the auxiliary power bus 54. Alternatively, the auxiliary power source 50 may be a separately powered source or a battery. The auxiliary machine 56 may be any prior art PM machine.

The control current regulator 52 preferably comprises an H-bridge circuit. The regulator 52 supplies control current $I_c$ to multiple control coils 24 in the machine 2, 28 by way of a control current supply bus 62. A control current sensor 64 monitors the level of control current passing through the control current supply bus 62 and generates a corresponding control current feedback signal representative of its level on a control current feedback signal line 66.

A multiphase AC main power rectifier 68 receives multiphase AC power from the stator coils 20 of the machine 2, 28 on a multiphase AC main power bus 70 and converts it to DC main power on a DC main power bus 72 for supply to a DC load 74. A main power voltage sensor 76 monitors the level of voltage on the DC main power bus 72 and generates a corresponding main power voltage feedback signal representative of its level on a main power voltage feedback signal line 78.

A voltage signal comparator 80 receives a main power voltage reference signal on a voltage reference line 82 and compares it to the main power voltage feedback signal on the main power voltage signal line 78 to generate a voltage difference signal representative of the difference between them on a voltage difference signal line 84. A main power voltage feedback proportional-plus-integral (PI) controller 86 receives the voltage difference signal on the voltage difference signal line 84 and converts it to a stable control current reference signal on a control current reference signal line 88.

A current signal comparator 90 compares the control current reference signal on the control current reference signal line 88 with the control current feedback signal on the control current feedback signal line 66 to generate a current difference signal on a current difference signal line 92. A control current feedback PI controller 94 receives the current difference signal on the current difference signal line 92 and converts it to a stable control current regulating signal on a control current regulating signal line 96.

A pulse width modulator (PWM) circuit 98 receives the control current regulating signal on a control current regulating signal line 96 and generates corresponding PWM control signals on a PWM control signal bus 100. A gate drive circuit 102 receives the PWM control signals on a PWM control signal bus 100 and generates corresponding gate drive signals on a gate drive signal bus 104.

The control current regulator 52 receives the gate drive signals on the gate drive signal bus 104 to produce a level of the control current $I_c$ on the control current supply bus 62 responsive to a main power voltage feedback loop 106 and a control current feedback loop 108.

Figure 5:
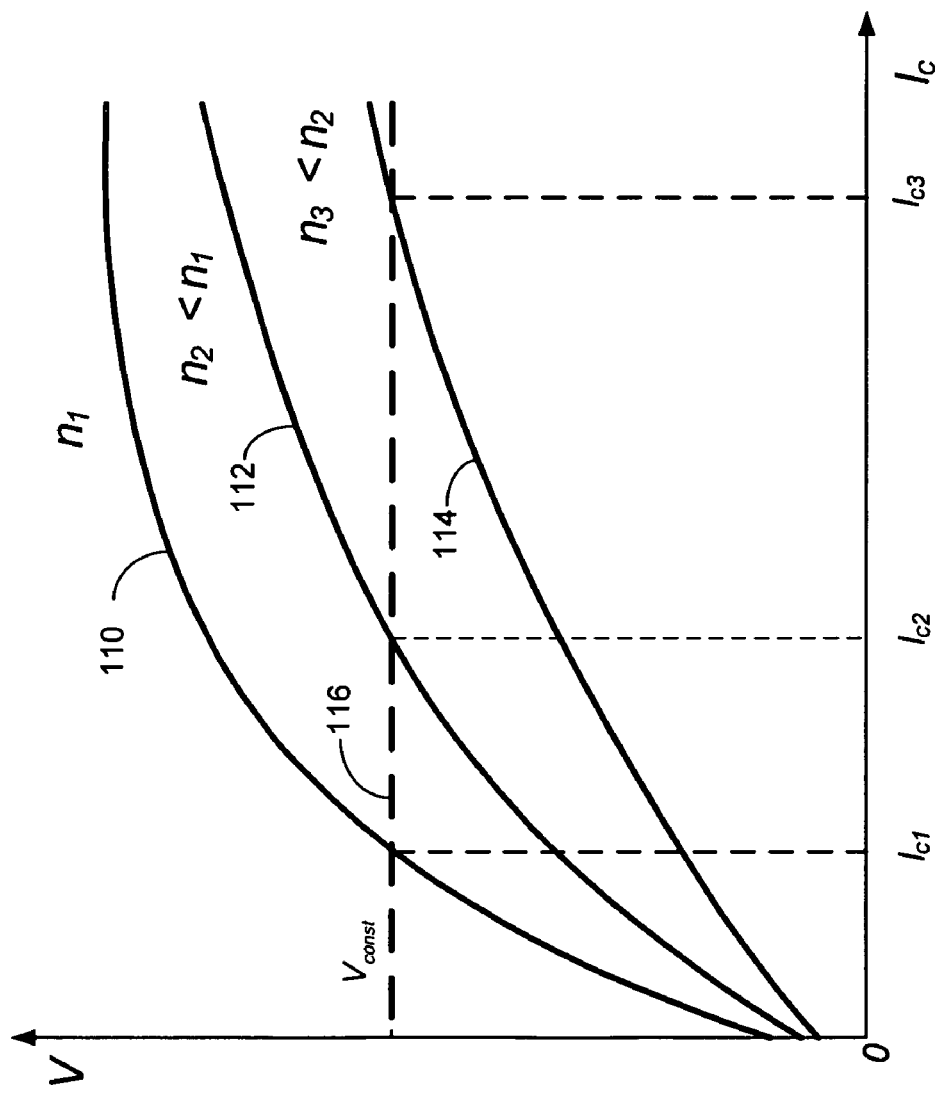
FIG. 5 is a graphical representation of voltage as a function of three different angular velocities of the PM machines of FIGS. 1 and 2.

FIG. 5 is a graphical representation of voltage V as a function of three different angular velocities $n_1$, $n_2<n_1$, and $n_3<n_2$ of the PM machines 2, 28 in the electrical power generating system 46. Line 110 represents angular velocity $n_1$, line 112 represents angular velocity $n_2$ and line 114 represents angular velocity $n_3$. Line 116 represents a constant reference voltage output $V_{const}$ for application of respective control currents $I_{c1}$, $I_{c2}$ and $I_{c3}$ to the control coils 24.

The described embodiments of the invention are only some illustrative implementations of the invention wherein changes and substitutions of the various parts and arrangement thereof are within the scope of the invention as set forth in the attached claims.

The claimed invention is:

1. A permanent magnet (PM) electric generator with directly controllable field excitation control comprising:
   a drive shaft;
   a PM rotor assembly with multiple PMs arranged around an outer axial periphery of the rotor assembly;
   a stator assembly comprising a ferromagnetic stator yoke, multiple ferromagnetic stator teeth mounted to the stator yoke with distal ends proximate the outer axial periphery of the rotor assembly separated by an air gap and multiple stator coils mounted between the stator teeth;
   multiple saturable ferromagnetic shunts, each shunt coupling adjacent distal ends of the stator teeth to shunt air gap magnetic flux $\Phi_g$ generated by the PMs across the air gap through the distal ends of the stator teeth; and
   multiple saturation control coils, each saturation control coil wrapped about a saturable region of an associated one of the shunts;
   wherein application of a control current $I_c$ to the control coils at least partially magnetically saturates the shunts to reduce shunting of air gap magnetic flux $\Phi_g$, thereby increasing magnetic flux linkage $\Psi_M$ between the PMs and the stator coils and increasing generated electromagnetic force (EMF) at lower levels of rotor assembly angular velocity.

2. The generator of claim 1, wherein each shunt comprises a generally wedge-shaped shunt that mounts between the distal ends of adjacent ones of the stator teeth.

3. The generator of claim 1, wherein each shunt has a laminated ferromagnetic alloy construction.

4. The generator of claim 1, wherein each shunt comprises a sintered magnetic powder construction.

5. The generator of claim 1, wherein each control coil comprises a coil of a conductor wrapped around its associated shunt.

6. The generator of claim 1, further comprising a generally star-shaped stator tooth and shunt structure mounted within the stator yoke that forms the stator teeth and shunts.

7. The generator of claim 6, wherein the stator tooth and shunt structure comprises a ferromagnetic stamping.

8. The generator of claim 6, wherein each shunt is an integral saturable ferromagnetic region between stator teeth of the stator tooth and shunt structure.

9. The generator of claim 1, wherein the control coils attach to each other in series.

10. The generator of claim 9, wherein the control current $I_c$ is alternating current (AC).

11. The generator of claim 9, wherein the control current $I_c$ is direct current (DC).

12. The generator of claim 1, wherein adjacent ones of the control coils connect to each other to arrange their respective shunting magnetic fluxes $\Phi_{sh}$ in opposition.

13. The generator of claim 12, wherein a first side of each control coil connects to a first side of a preceding adjacent control coil in the series connection and a second side of each control coil opposite the first side connects to second side of the following adjacent control coil in the series connection.

14. A permanent magnet (PM) electric generator system with directly controllable field excitation control comprising:
   a prime mover;
   a main PM generator coupled to the prime mover comprising a PM rotor assembly with multiple PMs arranged around an outer axial periphery of the rotor assembly, a stator assembly comprising a ferromagnetic stator yoke, multiple ferromagnetic stator teeth mounted to the stator yoke with distal ends proximate the outer axial periphery of the rotor assembly separated by an air gap and multiple stator coils mounted between the stator teeth, multiple generally wedge-shaped saturable ferromagnetic shunts, each shunt mounting between adjacent distal ends of the stator teeth to shunt air gap magnetic flux $\Phi_g$ generated by the PMs across the air gap through the distal ends of the stator teeth; and multiple saturation control coils, each saturation control coil wrapped about a saturable region of an associated one of the shunts;
   a main power rectifier system for converting multiphase alternating current (AC) that the main PM stator coils generate to direct current (DC) main power on a DC power bus that feeds a DC load;
   an auxiliary power source;
   a control current regulator that regulates current from the auxiliary power source to produce control current $I_c$ for the PM generator control coils;
   a main power voltage feedback loop that compares voltage on the DC power bus to a reference voltage and generates a reference control current signal representative of the difference; and
   a control current feedback loop that compares the control current to the control current reference signal and generates a control current regulating signal representative of the difference that changes the control current produced by the control current regulator.

15. The system of claim 14, wherein the auxiliary power source comprises a multiphase AC auxiliary PM generator driven by the prime mover and a multiphase AC rectifier that converts AC power generated by the auxiliary PM generator to DC power.

16. The system of claim 14, wherein the control current regulator comprises an H-bridge circuit.

17. The system of claim 16, further comprising a pulse width modulator (PWM) circuit that receives the control current regulating signal and generates corresponding PWM control signals.

18. The system of claim 17, further comprising a gate drive circuit that receives the PWM control signals and generates corresponding gate drive signals that drive the H-bridge circuit.

19. The system of claim 14, wherein the main power voltage feedback loop comprises:

a main power voltage sensor that monitors the level of voltage on the DC main power bus and generates a corresponding main power voltage feedback signal representative of its level;

a voltage signal comparator that receives a main power voltage reference signal and compares it to the main power voltage feedback signal to generate a voltage difference signal representative of the difference between them; and a main power voltage feedback proportional-plus-integral (PI) controller that receives the voltage difference signal and converts it to the control current reference signal.

20. The system of claim 14, wherein the control current feedback loop comprises:

a control current sensor that monitors the level of control current $I_c$ and generates a corresponding control current feedback signal representative of its level;

a current signal comparator that compares the control current reference signal with the control current feedback signal to generate a current difference signal; and a control current feedback PI controller that receives the current difference signal converts it to the control current regulating signal.

* * * * *